US010248538B2

(12) United States Patent
Roh

(10) Patent No.: US 10,248,538 B2
(45) Date of Patent: Apr. 2, 2019

(54) CONTROLLER OF SEMICONDUCTOR MEMORY DEVICE FOR DETECTING EVENT AND STORING EVENT INFORMATION AND OPERATING METHOD THEREOF

(71) Applicant: SK hynix Inc., Gyeonggi-do (KR)

(72) Inventor: Young Dong Roh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 49 days.

(21) Appl. No.: 15/233,797

(22) Filed: Aug. 10, 2016

(65) Prior Publication Data

US 2017/0269874 A1 Sep. 21, 2017

(30) Foreign Application Priority Data

Mar. 15, 2016 (KR) .................. 10-2016-0030854

(51) Int. Cl.
*G06F 11/00* (2006.01)
*G06F 11/36* (2006.01)

(52) U.S. Cl.
CPC ............ *G06F 11/362* (2013.01); *G06F 11/36* (2013.01)

(58) Field of Classification Search
CPC .... G06F 3/0659; G06F 3/0604; G06F 3/0653; G06F 3/0673
See application file for complete search history.

(56) References Cited

U.S. PATENT DOCUMENTS

| 5,371,856 | A | * | 12/1994 | Yoshino | ................. H04L 29/06 711/1 |
| 5,602,829 | A | * | 2/1997 | Nie | ......................... H04L 47/10 370/235 |
| 6,000,006 | A | * | 12/1999 | Bruce | ................. G06F 11/1068 711/103 |
| 6,173,339 | B1 | * | 1/2001 | Yorimitsu | ........... G06F 11/0757 710/260 |
| 7,133,972 | B2 | * | 11/2006 | Jeddeloh | ............. G06F 12/0862 709/250 |
| 7,725,758 | B2 | * | 5/2010 | Link | ........................ G06F 1/14 368/108 |
| 9,335,936 | B2 | * | 5/2016 | Busick | .................. G06F 3/0611 |
| 2002/0016568 | A1 | * | 2/2002 | Lebel | .................... A61M 5/172 604/131 |
| 2002/0065646 | A1 | * | 5/2002 | Waldie | ................ G06F 11/3644 703/26 |

(Continued)

FOREIGN PATENT DOCUMENTS

| KR | 1020050021932 | 3/2005 |
| KR | 1020060042366 | 5/2006 |
| KR | 100832645 | 5/2008 |

*Primary Examiner* — Francisco A Grullon
(74) *Attorney, Agent, or Firm* — IP & T Group LLP

(57) ABSTRACT

There are provided a controller of a semiconductor memory device, which stores data for debug processing, and an operating method of the controller. A controller for controlling a semiconductor memory device includes an event occurrence detection unit configured to detect whether an event occurs, an event information generation unit configured to generate event information in response to the detecting result from the event occurrence detection unit, and a command generation unit configured to generate a command for storing the event information in the semiconductor memory device.

20 Claims, 6 Drawing Sheets

(56) References Cited

U.S. PATENT DOCUMENTS

| | | | | |
|---|---|---|---|---|
| 2008/0165914 A1* | 7/2008 | Horgan | ............... | H03K 21/00 |
| | | | | 377/51 |
| 2013/0107647 A1* | 5/2013 | Kang | ................ | G11C 16/06 |
| | | | | 365/191 |
| 2013/0346719 A1* | 12/2013 | Tomlinson | ............ | G06F 12/10 |
| | | | | 711/165 |
| 2014/0095786 A1* | 4/2014 | Moon | ............... | G11C 11/4078 |
| | | | | 711/109 |
| 2014/0189286 A1* | 7/2014 | Chang | .............. | G06F 12/109 |
| | | | | 711/208 |
| 2014/0237205 A1* | 8/2014 | Takefman | ........... | H03M 13/05 |
| | | | | 711/162 |
| 2015/0021444 A1* | 1/2015 | Goergen | ............. | G06F 3/0604 |
| | | | | 246/122 R |
| 2015/0347031 A1* | 12/2015 | Dallas | ............... | G06F 3/061 |
| | | | | 711/154 |
| 2017/0117030 A1* | 4/2017 | Fisch | ................ | G11C 11/406 |
| 2017/0192914 A1* | 7/2017 | Riedy | ................ | G06F 13/24 |

* cited by examiner

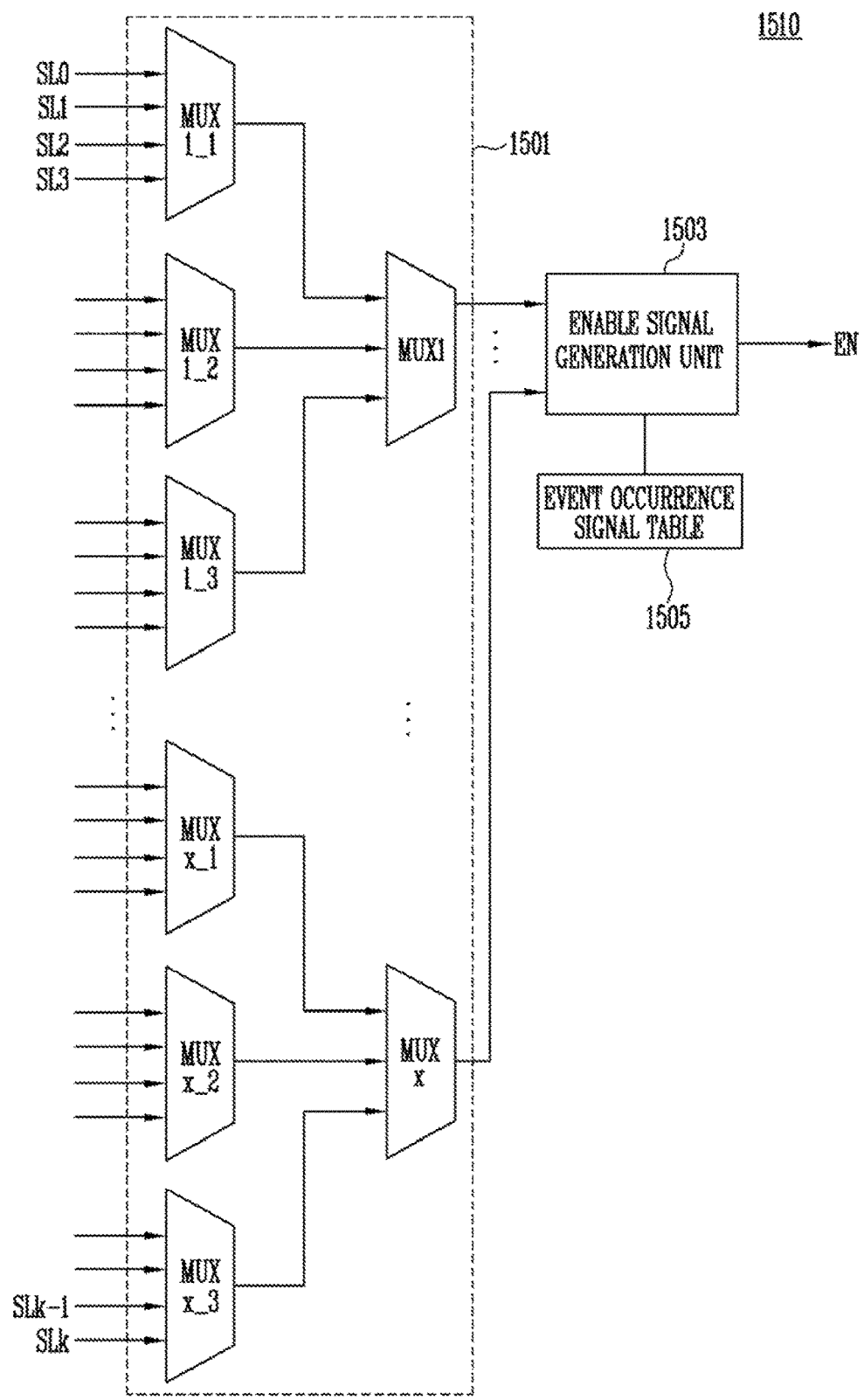

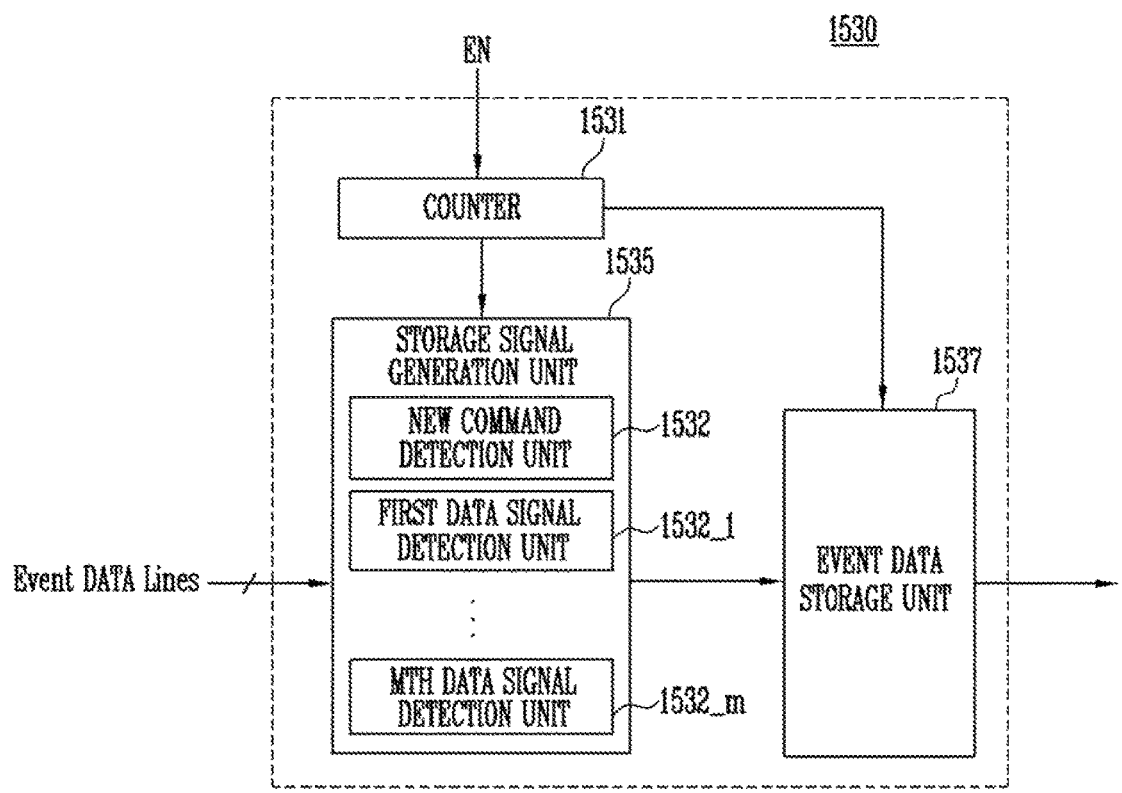

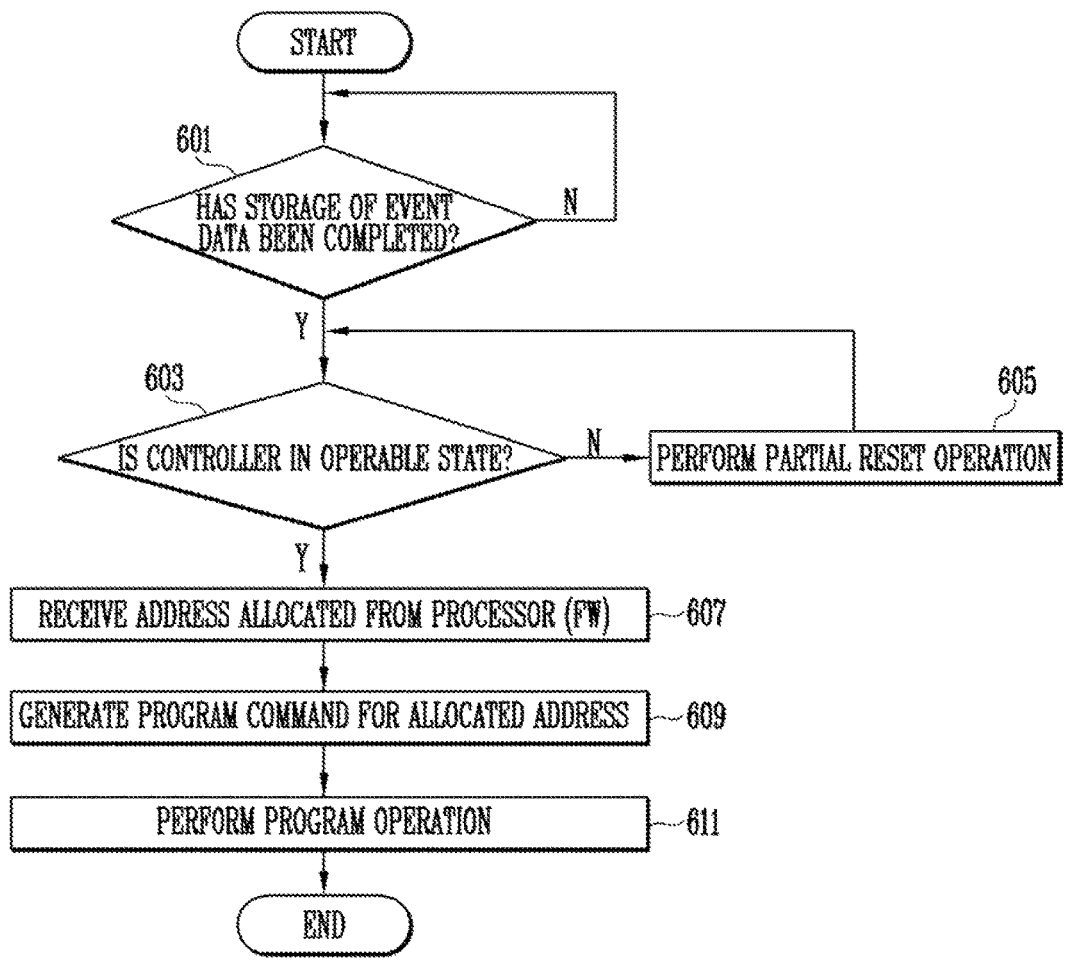

CONTROLLER OF SEMICONDUCTOR MEMORY DEVICE FOR DETECTING EVENT AND STORING EVENT INFORMATION AND OPERATING METHOD THEREOF

CROSS-REFERENCE TO RELATED APPLICATION

The present application claims priority under 35 U.S.C. § 119(a) to Korean patent Application No. 10-2016-0030854, filed on Mar. 15, 2016, which is incorporated herein by reference in its entirety.

BACKGROUND

1. Field

An aspect of the present invention relates to an electronic device and, more particularly, to a memory system and an operating method thereof.

2. Description of the Related Art

A memory system is widely used as a data storage device of digital devices, such as, for example, a computer, a digital camera, an MP3 player, and a smart phone. The memory system may include a semiconductor memory device for storing data and a controller for controlling the semiconductor memory device. The digital device operate as a host for the memory system, and the controller transmits commands and data between the host and the semiconductor memory device.

A semiconductor memory device includes one or more integrated circuits ICs which are implemented on a semiconductor material, such as, a silicon (SI), germanium (Ge), gallium arsenide (GaAs), or indium phosphide (InP). Semiconductor memory devices are generally classified into volatile memory devices and nonvolatile memory devices.

A volatile memory device loses its stored data when the power supply to the device is turned off. Examples of volatile memory devices include a static random access memory (SRAM), a dynamic RAM (DRAM), a synchronous DRAM (SDRAM), and the like. A nonvolatile memory device retains its stored data even when a power supply to the device is turned off. Examples of nonvolatile memory devices include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. A flash memory is generally classified into a NOR and a NAND flash memory.

SUMMARY

Embodiments of the present invention provide an improved controller for a semiconductor memory device, and an operating method of the controller. The controller may store data for debug processing.

According to an aspect of the present disclosure, there is provided a controller for controlling a semiconductor memory device, the controller including: an event occurrence detection unit configured to detect whether an event occurs; an event information generation unit configured to generate event information in response to the detecting result from the event occurrence detection unit; and a command generation unit configured to generate a command for storing the event information in the semiconductor memory device.

According to an aspect of the present disclosure, there is provided a method of operating a controller for controlling a semiconductor memory device, the method including: comparing event signals input through a plurality of event signal lines with an event expectation value representing states of the event signals when an event occurs, thereby detecting the occurrence of the event; generating event information including event data from a preset time before and after a point of time when the event occurs; and generating a command for storing the event information in the semiconductor memory device.

BRIEF DESCRIPTION OF THE DRAWINGS

Embodiments of the present invention will now be described in reference to the following drawings, wherein.

FIG. 3 is a block diagram illustrating an example of an event occurrence detection unit employed in the debug processor of FIG. 2;

FIG. 4 is a block diagram illustrating an example of an event information generation unit employed in the debug processor of FIG. 2;

FIG. 5 is a diagram illustrating an example of an event occurrence signal table, according to an embodiment of the invention;

FIG. 6 is a flowchart illustrating an operation of the controller, according to an embodiment of the present invention;

DETAILED DESCRIPTION

Figure 1:
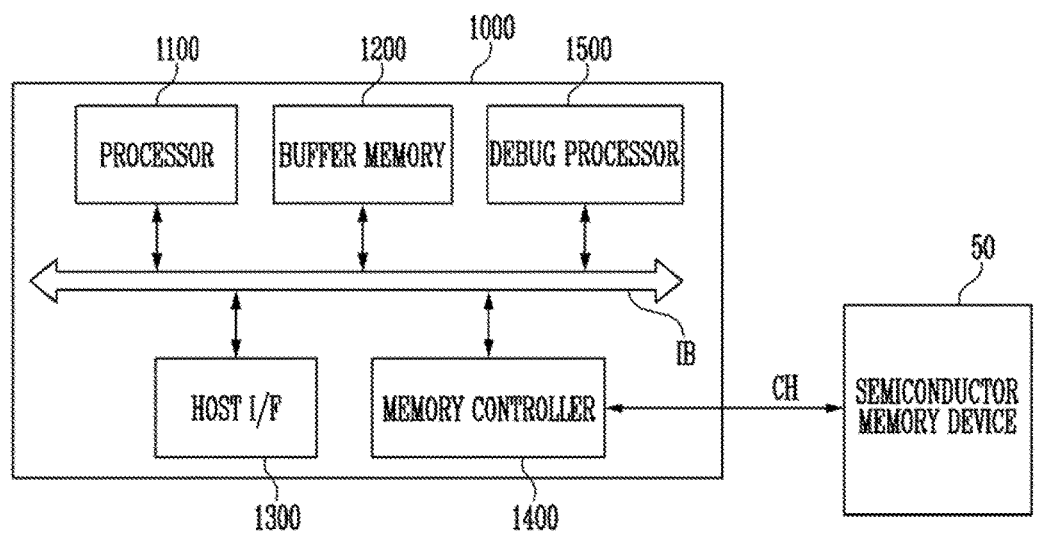
FIG. 1 is a block diagram illustrating a controller, according to an embodiment of the present invention.

The specific structural or functional description disclosed herein is merely illustrative for the purpose of describing embodiments according to the present invention. We note, however, that embodiments according to the present invention can be implemented in various forms, and cannot be construed as being limited to the embodiments set forth herein.

The embodiments according to the concept of the present invention may be variously modified and may have various shapes. Thus, the embodiments are illustrated in the drawings and are intended to be described herein in detail. However, the embodiments according to the concept of the present invention are not construed as being limited to specified disclosures, and may include all changes, equivalents, or substitutes that do not depart from the spirit and scope of the present invention.

While terms such as, for example, "first" and "second" may be used to describe various components, such components must not be understood as being limited to the above terms. The above terms are used only to distinguish one component from another. For example, a first component may be referred to as a second component, and likewise a second component may be referred to as a first component.

It will be understood that when an element is referred to as being "connected" or "coupled" to another element, it can be directly connected or coupled to the other element or Intervening elements may also be present. In contrast, when an element is referred to as being "directly connected" or "directly coupled" to another element, no intervening elements are present. Meanwhile, other expressions describing relationships between components such as, "between," "Immediately between" or "adjacent to" and "directly adjacent to" may be construed similarly.

The terms used in the present application are merely used to describe particular embodiments, and are not intended to limit the present invention. Singular forms in the present invention are intended to include the plural forms as well, unless the context clearly indicates otherwise.

So far as not being differently defined, all terms used herein including technical or scientific terminologies have meanings that they are commonly understood by those skilled in the art to which the present invention pertains. The terms having the definitions as defined in the dictionary should be understood such that they have meanings consistent with the context of the related technique. So far as not being clearly defined in this application, terms should not be understood in an ideally or excessively formal way.

The drawings are not necessarily to scale and, in some instances, proportions may have been exaggerated in order to clearly illustrate features of the embodiments.

It will be further understood that the terms "comprises", "comprising", "Includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, exemplary embodiments of the present invention will be described in detail with reference to the accompanying drawings.

FIG. 1 illustrates a controller 1000, according to an embodiment of the present invention.

Referring to FIG. 1, a memory system may include a semiconductor memory device 50 and a controller 1000.

The semiconductor memory device 50 may be a nonvolatile memory device. The semiconductor memory device 50 may, for example, be a NAND flash memory, a vertical NAND flash memory, a NOR flash memory, a resistive random access memory (RRAM), a phase-change random access memory (PRAM), a magnetroresistive random access memory (MRAM), a ferroelectric random access memory (FRAM), a spin transfer torque random access memory (STT-RAM), or the like. The semiconductor memory device 50 may be implemented in a three-dimensional array structure. The present invention may be applied to a flash memory device in which a charge storage layer is formed by a conductive floating gate (FG). The present invention may also be applied to a charge trap flash (CTF) memory in which a charge storage layer is formed of an insulation film.

The semiconductor memory device 50 is configured to receive a command, an address, and data from the controller 1000 through a channel CH and access an area selected by the address in a memory cell array included in the semiconductor memory device 50. The semiconductor memory device 50 may perform an operation corresponding to the command received to the area selected by the address. Specifically, the semiconductor memory device 50 may perform a program, read, and erase operations. In a program operation, the semiconductor memory device 50 may program the data in the area selected by the address. In a read operation, the semiconductor memory device 50 may read the data from the area selected by the address. In an erase operation, the semiconductor memory device 50 may erase the data stored in the area selected by the address.

The controller 1000 may include a processor 1100, a buffer memory 1200, a host interface (I/F) 1300, a memory controller 1400, a debug processor 1500, and an internal bus IB.

The processor 1100 controls the general operations of the controller 1000. For example, the processor 1100 may drive firmware (FW) for controlling the semiconductor memory device 50. The processor 1100 may be configured to operate FW, such as, for example, a flash translation layer (FTL). If a request is received from a host (not shown) through the host interface 1300, the processor 1100 may generate a physical block address corresponding to the request. The processor 1100 may translate a logical block address included in the request into the physical block address.

When the request from the host is a read request, the processor 1100 may store, in the buffer memory 1200, a physical block address and a read command corresponding to the read request. The read command and the physical block address, which are stored in the buffer memory 1200, may be transmitted to the semiconductor memory device 50 by the memory controller 1400.

When the request from the host is an erase request, the processor 1100 may store, in the buffer memory 1200, a physical block address and an erase command corresponding to the erase request. The erase command and the physical block address, which are stored in the buffer memory 1200, may be transmitted to the semiconductor memory device 50 by the memory controller 1400.

When the request from the host is a program request, program data may be additionally received from the host. The processor 1100 may store, in the buffer memory 1200, a physical block address, the program data, and a program command corresponding to the program request. The program command, the physical block address, and the program data, which are stored in the buffer memory 1200, may be transmitted to the semiconductor memory device 50 by the memory controller 1400. The semiconductor memory device 50 may be specified by the physical block address.

The processor 1100 may manage a command queue including commands transmitted to the semiconductor memory device 50. The command queue may, for example, be managed by a first in first out (FIFO) method. The processor 1100 generates a command in response to a request of the host and inputs the generated command to the command queue. Commands inputted to the command queue may be sequentially or randomly performed.

In an embodiment, the processor 1100 may generate, for itself, a program command, a physical block address, and program data without any request from the host, and transmit them to the semiconductor memory device 50. For example, the processor 1100 may generate a write command, a physical block address, and program data to perform background operations, such as, for example, a program operation for wear leveling and a program operation for garbage collection, and command writing.

In an embodiment of the present invention, the processor 1100 may allocate a physical block address at which event information is to be stored in response to a request of the debug processor 1500. For example, the processor 1100 may generate a physical block address at which event data is to be stored, and provide the generated address to the debug processor 1500.

The buffer memory 1200 may be used as a working memory of the processor 1100. Alternatively, the buffer memory 1200 may be used as a buffer memory between the semiconductor memory device 50 and the host. In an embodiment, the buffer memory 1200 may be used as a cache memory between the semiconductor memory device 50 and the host. In an exemplary embodiment, the buffer memory 1200 may include at least one of various randomly accessible memories, such as, for example, a static random access memory (SRAM), a dynamic RAM (DRAM), a synchronous DRAM (SDRAM), a phase-change RAM (PRAM), a magnetic RAM (MRAM), a resistive RAM (RRAM), and a ferroelectric RAM (FRAM).

If a program fail occurs, the buffer memory 1200 may allocate a collection address for storing collection data in response to a request of the debug processor 1500. In an embodiment, a partial area of the buffer memory 1200 may be previously allocated as a collection address for storing collection data. The buffer memory 1200 may store collection data collected by the debug processor 1500 at the allocated collection address.

The host interface 1300 may include a protocol for performing communication between the host and the controller 1000. In an embodiment, the controller 1000 may be configured to communicate with the host through at least one of various interface protocols, such as, for example, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, and a private protocol.

The memory controller 1400 includes a protocol for providing an interface for communicating with the semiconductor memory device 50. In an embodiment, the memory controller 1400 may include at least one flash interface, such as, for example, a NAND interface and a NOR interface.

The memory controller 1400 provides a path for processing data transmitted to the semiconductor memory device 50 and a path for processing data received from the semiconductor memory device 50. For example, the memory controller 1400 may provide a read data path and a write data path. The read data path may be a path for receiving data read from the semiconductor memory device 50, for performing decoding of an error correction code (ECC) on the data, and then for storing the data in the buffer memory 1200. The write data path may be a path through which the controller 1000 may perform encoding of an ECC on data so as to store the data in the semiconductor memory device 50 and then transmit the data to the semiconductor memory device 50.

In an embodiment, although not shown in FIG. 1, the memory controller 1400 may include a plurality of semiconductor memory devices coupled through one common channel.

The debug processor 1500 may monitor internal signal lines or external signal lines of the controller 1000. If an arbitrary event occurs, the debug processor 1500 may generate event information before and after the point of time when the event occurs. The event information may include information on various states of the internal or external signal lines. The event information may include information on various states of the internal or external signal lines from the point of time when the event occurs until a preset time elapses.

The debug processor 1500 may request the processor 1100 of a physical block address at which the generated event information is to be stored, and receive an allocated physical block address. The debug processor 1500 may generate a program command where the generated event information is to be stored at the allocated physical block address. The debug processor 1500 may provide the semiconductor memory device 50 with the generated program command, the physical block address, and the event information.

The internal bus IB is configured to provide a channel between the components of the controller 1000. In an embodiment, the internal bus IB may be a common channel for transmitting commands and data. In another embodiment, the internal bus IB may include separate command and data channels for respectively transmitting command and data.

Figure 2:
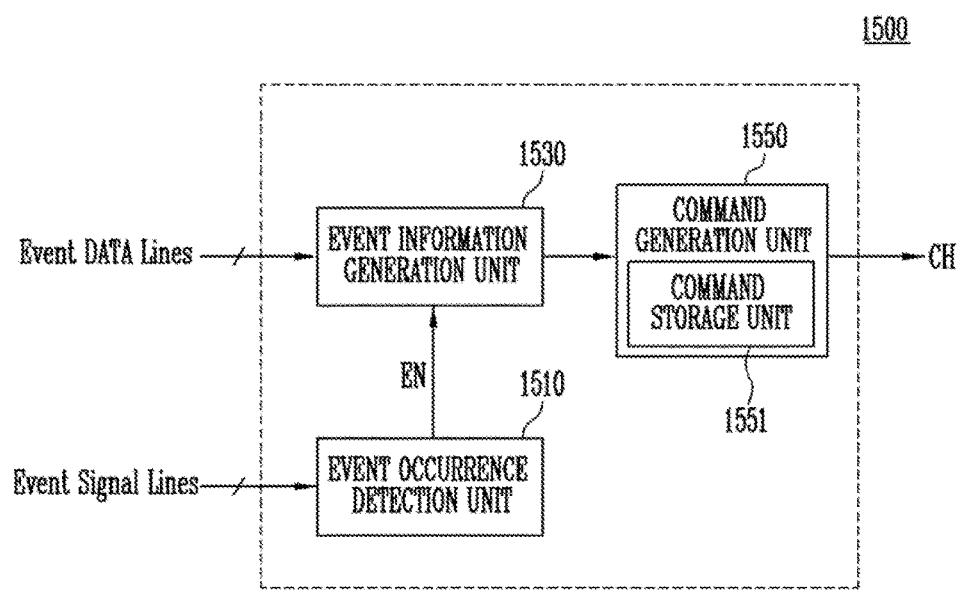
FIG. 2 is a block diagram illustrating an example of a debug processor employed in the controller of FIG. 1.

FIG. 2 is a block diagram illustrating a configuration example of the debug processor 1500 of FIG. 1.

Referring to FIG. 2, the debug processor 1500 may include an event occurrence detection unit 1510, an event information generation unit 1530, and a command generation unit 1550.

The event occurrence detection unit 1510 may be coupled to a plurality of event signal lines. The event occurrence detection unit 1510 may monitor a plurality of signals of the plurality of event signal lines. The plurality of event signal lines may be coupled to the internal signal lines or external signal lines of the controller 1000. The event occurrence detection unit 1510 may detect the occurrence of an event according to signals of the plurality of event signal lines. For example, the event occurrence detection unit 1510 may compare inputs of the plurality of signal lines with an event occurrence signal table that stores event signal values when an event occurs, thereby detecting the occurrence of the event. If an event occurs, the event occurrence detection unit 1510 may transmit an enable signal EN to the event information generation unit 1530. The configuration and operation of the event occurrence detection unit 1510 will be described in detail with reference to FIG. 3.

The event information generation unit 1530 may be coupled to event data lines. The event data lines may be coupled to the internal signal lines or external signal lines of the controller 1000. The event information generation unit 1530 may receive event data through the event data lines. The event data may represent states of the internal signal lines or external signal lines of the controller 1000. The event information generation unit 1530 may store the received event data. The event information generation unit 1530 may generate event information on the basis of the received event data. The event information generation unit 1530 may generate event information including event data from before a preset time t-n to a point of time t when an event occurs and event data from the point of time t when the event occurs to a time t+n when the preset time elapses. For example, the event information generation unit 1530 may receive an enable signal EN indicating that the event has occurred from the event occurrence detection unit 1510. The event information generation unit 1530 may store the event data from before the preset time t−n to the point of time t when an event occurs and the event data from the point of time t when the event occurs to the time t+n when the preset time elapses, in response to the enable signal EN. The configuration and operation of the event information generation unit 1530 will be described in detail with reference to FIG. 4.

The command generation unit 1550 may generate a program command for storing event information in the semiconductor memory device 50. In an embodiment, the command generation unit 1550 may generate a read command or erase command for performing a read or erase operation on the basis of an occurring event and stored event information. The command generation unit 1550 may further include a command storage unit 1551 for storing a plurality of commands to generate a command for processing an occurring event on the basis of the occurring event and stored event information.

If the event information generation unit 1530 generates event information, the command generation unit 1550 may determine whether the controller 1000 and the semiconductor memory device 50 are in an operable state to program the generated event information. When the controller is not in the operable state, the command generation unit 1550 may perform a partial reset operation for selectively resetting those parts required to operate the controller 1000. The command generation unit 1550 may transmit a reset signal to signal lines coupled to the parts required in the partial reset operation.

The command generation unit 1550 may select a command for processing the occurring event on the basis of the occurring event and the stored event information among the plurality of commands stored in 1o the command storage unit 1551. The command generation unit 1550 may request the processor 1100 of a physical block address at which the event information is to be stored in the semiconductor memory device 50. The command generation unit 1550 may transmit the generated command, the physical block address, and the event information to the semiconductor memory device 50.

FIG. 3 illustrates an example configuration of the event occurrence detection unit 1510 of FIG. 2.

Referring to FIG. 3, the event occurrence detection unit 1510 may include an event signal input unit 1501, an enable signal generation unit 1503, and an event occurrence signal table 1505.

The event signal input unit 1501 is coupled to a plurality of event signal lines SL0 to SLk. The event signal input unit 1501 may include a plurality of multiplexers MUX1 to MUXx for selectively outputting event signals input through the plurality of event signal lines SL0 to SLk. Each of the plurality of multiplexers MUX1 to MUXx may include subordinate multiplexers MUX1_1 to MUX1_3, . . . , MUXx_1 to MUXx_3.

The enable signal generation unit 1503 may detect whether an event occurs on the basis of received event signals and the event occurrence signal table 1505. If an event occurs, the enable signal generation unit 1503 may generate an enable signal EN for generating event information.

The enable signal generation unit 1503 may detect a program time-out event that may occur while the controller 1000 is performing a program operation of storing data in the semiconductor memory device 50. Specifically, the enable signal generation unit 1503 may detect the program time-out event, based on whether a monitoring signal periodically inputted for every set time is continuously inputted for a time-out time and whether the value of a data length counter for counting data input to the semiconductor memory device 50 has reached a value of '0.'

Here, the time-out time may be a time when the data is transferred to the semiconductor memory device 50 (i.e., data transfer time). For example, when the set time is 1 μs, the monitoring signal is inputted for every 1 μs. If the input monitoring signal does not exist for the time-out time, it may be recognized that the monitoring signal is in a time-out state.

The data input to the semiconductor memory device 50 is input until the value of the data length counter reaches '0.' Therefore, a case where the value of the data length counter is not 0 may be detected according to a signal of an event signal line coupled to the data length counter among the event signal lines.

The enable signal generation unit 1503 receives event signals. Then, if the monitoring signal is in the time-out state, and the value of the data length counter is not 0, the enable signal generation unit 1503 may detect that a program time-out event has occurred.

The event occurrence signal table 1505 is a table obtained by storing, in the form of a table, kinds of event signals and operation states of the controller 1000 or the semiconductor memory device 50 according to states of the event signals. For example, the event occurrence signal table 1505 includes an event signal expectation value representing states of event signals when an event occurs. The enable signal generation unit 1503 may detect the occurrence of the event by comparing the event signal expectation value with the states of the event signals. In an embodiment, contents of the event occurrence signal table 1505 may be changed or updated through setting.

FIG. 4 is a block diagram illustrating a configuration example of the event information generation unit 1530 of FIG. 2.

Referring to FIG. 4, the event information generation unit 1530 may include a counter 1531, a storage signal generation unit 1535, and an event data storage unit 1537.

The event information generation unit 1530 may receive an enable signal EN from the event occurrence detection unit 1510 and generate event information in response to the enable signal EN. The event information may be generated based on event data received through the event data lines. The event information may include event data before and after a point of time t when an event occurs, based on the point of time t when the event occurs. For example, the event information may include event data for a preset time t−n before the point of time t when the event occurs and event data after the point of time t when the event occurs for a time period t+n when the preset time elapses. In an embodiment, the preset time n may include a counter operation time for which the counter 1531 operates.

The counter 1531 may receive an enable signal EN from the event occurrence detection unit 1510. The counter 1531 may start its operation in response to the enable signal EN. The counter 1531 may end its operation when the counter operation time n is expired. For example, if the enable signal EN is received, the counter 1531 may perform a counting operation during the counter operation time n. If the enable signal EN is received, the counter 1531 may transmit an operation start signal to any one of the storage signal generation unit 1535 or the event data storage unit 1537. The counter 1531 starts the counting operation during the counter operation time n and ends the counting operation when the value of the counter 1531 becomes "0." If the value of the counter 1531 becomes "0," the counter 1531 may transmit an operation end signal to any one of the storage signal generation unit 1535 or the event data storage unit 1537. In various embodiments, the counter operation time n may be corrected by changing the value of a register included in the counter 1531.

The storage signal generation unit 1535 may be coupled to a plurality of event data lines. If the operation start signal is received from the counter 1531, the storage signal generation unit 1535 generates a storage signal and stores event data received through the event data lines in the event data storage unit 1537 according to the generated storage signal. If the operation end signal is received from the counter 1531, the storage signal generation unit 1535 may stop the generation of the storage signal.

The event data lines may be coupled to the Internal signal lines or external signal lines of the controller 1000. Event data may be received through the event data lines. The event data may represent states of the internal or external signal lines of the controller 1000.

The event data storage unit 1537 may be a storage space having an arbitrary size. In an embodiment, the event data storage unit 1537 may have a size capable of storing event data for a time that is at least two times (2n) longer than the counter operation time n of the counter 1531. In an embodiment, the event data storage unit 1537 may include a volatile memory device which loses stored data when a power supply is cut off. In an embodiment, the event data storage unit 1537 may be implemented as a static RAM (SRAM) or register.

In an embodiment, the event data storage unit 1537 may store event data according to a first-in first-out (FIFO method). For example, the event data storage unit 1537 may be configured as a register using the FIFO method. The event data storage unit 1537 may have a depth capable of storing event data during the time that is at least two times (2n) longer than the counter operation time n. When the event data stored during the counter operation time n is 128 Kbytes, the event data storage unit 1537 may have a size of 256 Kbytes. However, this is merely an embodiment for convenience of illustration, and the size of the event data storage unit 1537 is not limited by FIG. 4. Since data is stored by the FIFO method, event data during the time that is at least two times (2n) longer than the counter operation time n may be always stored in the event data storage unit 1537 according to a temporal order.

The event data storage unit 1537 may store event data from when the operation start signal is received from the counter 1531 to when the operation end signal is received from the counter 1531 as the counter operation time n is expired. Therefore, event data from the previous point of time t-n by the counter operation time n from the point of time t when the event occurs to the point of time t+n when the operation of the counter 1531 is ended may be stored in the event data storage unit 1537. That is, if the point of time when the event occurs is t, and the operation time of the counter 1531 is n, event data from the point of time t-n to the point of time t+n may be stored in the event data storage unit 1537. If the operation end signal is received from the counter 1531, the event data storage unit 1537 may stop the storage of event data and generate event information on the basis of the event data stored in the event data storage unit 1537. The event data storage unit 1537 may transmit the generated event information to the command generation unit 1550.

In an embodiment, the storage signal generation unit 1535 may include a new command detection unit 1532 and first to mth data signal detection units 1532_1 to 1532_m.

Data received through the event data lines may be stored by the FIFO method in the event data storage unit 1537 for every time, based on an internal clock signal. Therefore, if all event data received through the event data lines are stored in the event data storage unit 1537 for every time they are received, data unnecessary to be stored may also be repeatedly stored. In addition, there may be a limitation in the amount of data to be stored according to a storage capacity of the event data storage unit 1537.

The new command detection unit 1532 may detect that a new command has been received through the event data lines. If the new command detection unit 1532 detects the receipt of a new command, the storage signal generation unit 1535 may generate a storage signal and store event data in the event data storage unit 1537 in response to the generated storage signal.

The first to mth data signal detection units 1532_1 to 1532_m may detect that event data received through the event data lines has changed. If the first to mth data signal detection units 1532_1 to 1532_m detect that the event data has been changed, the storage signal generation unit 1535 may generate a storage signal and store event data in the event data storage unit 1537 in response to the generated storage signal. According to this embodiment, event data is not stored for every time data is received according to the internal clock signal, but may be stored in the event data storage unit 1537 only when a new command is received through the event data lines or when the event data is changed.

In the description with reference to FIG. 3, if the event occurrence detection unit 1510 detects a program time-out event, the event information generation unit 1530 may generate event information according to operations of the counter 1531, the storage signal generation unit 1535, and the event data storage unit 1537. The event information generated as the program time-out event is detected may include at least one of a kind of input command, an address of a data buffer, a total length of data to be transmitted, and a flag representing a current length of data or a time-out state.

FIG. 5 is a diagram illustrating an example of the event occurrence signal table 1505 of FIG. 3.

The event occurrence signal table 1505 is a table obtained by storing, in the form of a table, kinds of event signals and operation states of the controller 1000 or the semiconductor memory device 50. For example, the event occurrence signal table 1505 includes an event signal expectation value representing states of event signals when an event occurs.

Referring to FIG. 5, the event occurrence signal table 1505 may include a first field for signals (first to kth signals) received through the event signal lines, a second field for a state of each signal, and a third field for an operation (first to kth operation) expected when each signal is in the corresponding state.

Therefore, the enable signal generation unit 1530 may detect the occurrence of an event by comparing the event signal expectation value with the states of the event signals. In an embodiment, contents of the event occurrence signal table 1505 may be changed or updated through setting.

FIG. 6 is a flowchart illustrating an operation of the controller 1000 of FIG. 1, according to an embodiment of the present invention.

Referring to FIG. 6, in step 601, the controller 1000 may determine whether the storage of event data has been completed. For example, when an event occurs, the controller 1000 may determine whether event information including event data from the previous point of time t-n by the counter operation time n from the point of time t when the event occurs to the point of time t+n when the operation of the counter is ended, based on the point of time when the event occurs, has been generated. The event data may represent states of the internal signal lines or external signal lines of the controller 1000. In an embodiment, although not shown in this figure, a step of determining whether the event has occurred before step 601 may be further performed. The step of determining whether the event has occurred is the same as the operation of the event occurrence detection unit, described with reference to FIG. 3.

In step 603, the controller 1000 may determine whether the controller 1000 is in an operable state. For example, the controller 1000 may determine whether the controller 1000 is in an idle state in which the controller 1000 and the semiconductor memory device 50 are operable to program the event information. If it is determined that the controller 1000 is in the operable state, the controller 1000 proceeds to step 607. If it is determined that the controller 1000 is not in the operable state, the controller 1000 proceeds to step 605.

In step 605, the controller 1000 may perform a partial reset operation for selectively resetting parts required to operate the controller 1000. For example, the command generation unit 1550 of the controller 1000 may transmit a reset signal required in the partial reset operation.

In step 607, the controller 1000 may allocate a physical block address at which the event information is to be stored. Specifically, the processor 1100 may allocate a physical block address at which the event information is to be stored, and transmit the allocated physical block address to the debug processor 1500.

In step 609, the controller 1000 may generate a program command for storing the event information in the semiconductor memory device 50. In various embodiments, the controller 1000 may generate a read command or erase command for performing a read or erase operation on the basis of an occurring event and stored event information in addition to the program command. That is, the controller 1000 may select a command to process the occurring event on the basis of the occurring event and the stored event information among a plurality of commands stored in the command storage unit 1551.

In step 611, the controller 1000 may perform a program operation by transmitting the generated program command, the physical block address, and the event information to the semiconductor memory device 50.

Figure 7:
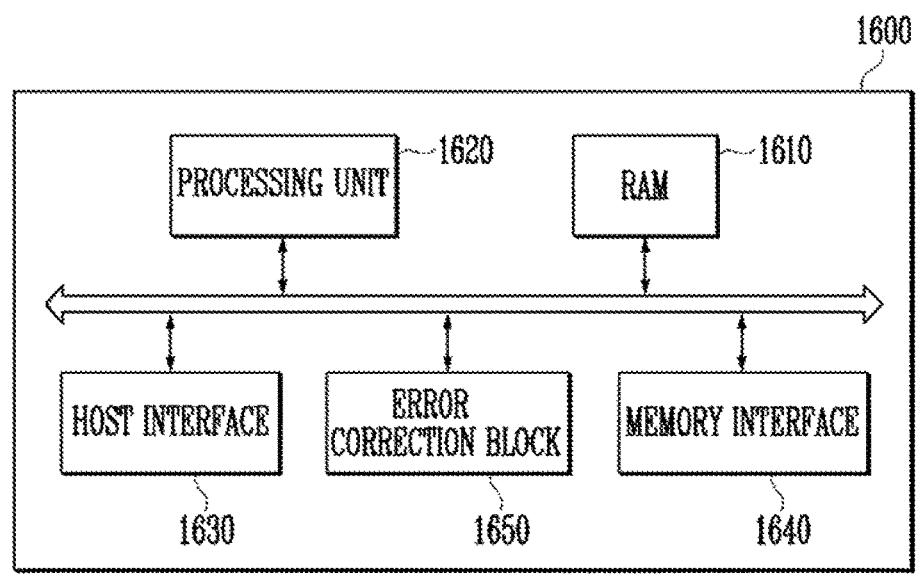
FIG. 7 is a block diagram illustrating a controller, according to another embodiment of the present invention.

FIG. 7 illustrates another embodiment for implementing a controller 1600 corresponding to the controller 1000 of FIG. 1.

Referring to FIG. 7, the controller 1600 may include a random access memory (RAM) 1610, a processing unit 1620, a host interface 1630, a memory interface 1640, and an error correction block 1650.

The processing unit 1620 may control the general operations of the controller 1600. The RAM 1610 may be used as at least one of an operation memory of the processing unit 1620, a cache memory between the semiconductor memory device and the host, and a buffer memory between the semiconductor memory device and the host. The processing unit 1620 may execute firmware, thereby performing functions of the processor 1100 described with reference with FIG. 1.

The host interface 1630 may include a protocol for exchanging data between the host and the controller 1600. In an embodiment, the controller 1600 may be configured to communicate with the host through at least one of various interface protocols, such as, for example, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, and a private protocol.

The memory interface 1640 may interface with a semiconductor memory device (SMD).

The error correction block 1650 may decode data received from the SMD by using an error correction code.

Figure 8:
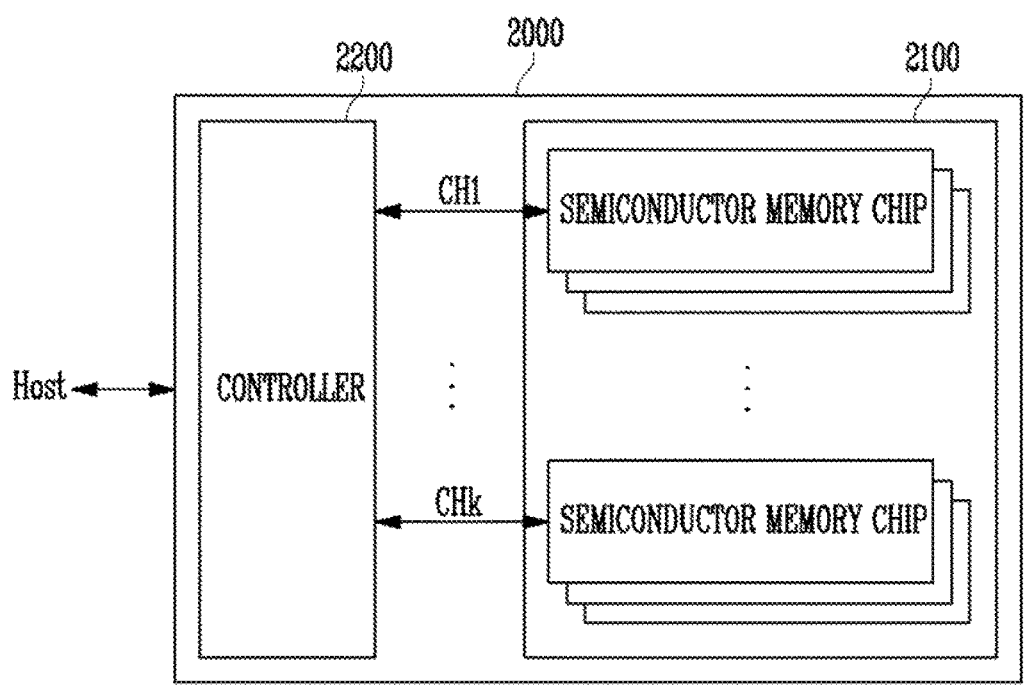
FIG. 8 is a block diagram illustrating an application example of a memory system, according to an embodiment of the present invention.

FIG. 8 is a block diagram illustrating an application example of a memory system 2000 including a controller 2200 corresponding to the controller of FIG. 1.

Referring to FIG. 8, the memory system 2000 includes a semiconductor memory device 2100 and the controller 2200. The semiconductor memory device 2100 includes a plurality of semiconductor memory chips. The plurality of semiconductor memory chips are divided into a plurality of groups.

In FIG. 8, it is illustrated that the plurality of groups communicate with the controller 2200 through first to kth channels CH1 to CHk. Each semiconductor memory chip may be configured and operated like the semiconductor memory device 50 described with reference to FIG. 1.

Each group is configured to communicate with the controller 2200 through one common channel. The controller 2200 is configured identically to the controller 1000 described with reference to FIG. 1. The controller 2200 is configured to control the plurality of memory chips of the semiconductor memory device 2100 through the plurality of channels CH1 to CHk. In FIG. 8, it is illustrated that a plurality of semiconductor memory chips are coupled to one channel. However, it will be understood that the memory system 2000 may be modified so that one semiconductor memory chip is coupled to one channel.

The controller 2200 and the semiconductor memory device 2100 may be integrated into one semiconductor device. As an exemplary embodiment, the controller 2200 and the semiconductor memory device 2100 may be integrated into one semiconductor device, to constitute a memory card. For example, the controller 2200 and the semiconductor memory device 2100 may be integrated into one semiconductor device, to constitute a memory card such as, a PC card (personal computer memory card international association (PCMCIA)), a compact flash (CF) card, a smart media card (SM or SMC), a memory stick, a multimedia card (MMC, RS-MMC or MMCmicro), an SD card (SD, miniSD, microSD or SDHC), or a universal flash storage (UFS).

The controller 2200 and the semiconductor memory device 2100 may be integrated into one semiconductor device to constitute a semiconductor drive (e.g., solid state drive (SSD)). The semiconductor drive SSD may include a storage device configured to store data in a semiconductor memory. If the memory system 2000 is used as the semiconductor drive SSD, the operating speed of the host coupled to the memory system 2000 may be improved substantially.

As another example, the memory system 2000 may be provided as one of various components of an electronic device, such as, a computer, a ultra mobile PC (UMPC), a workstation, a net-book, a personal digital assistant (PDA), a portable computer, a web tablet, a wireless phone, a mobile phone, a smart phone, an e-book, a portable multimedia player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

As an exemplary embodiment, the semiconductor memory device 2100 or the memory system 2000 may be packaged in various forms, such as, package on package (PoP), ball grid arrays (BGAs), chip scale packages (CSPs), plastic leaded chip carrier (PLCC), plastic dual in-line package (PDIP), die in Waffle pack, die in wafer form, chip on board (COB), ceramic dual in-line package (CERDIP), plastic metric quad flat pack (MQFP), thin quad flat pack (TQFP), small outline integrated circuit (SOIC), shrink small out line package (SSOP), thin small outline package (TSOP), thin quad flat pack (TQFP), system in package (SIP), multi chip package (MCP), wafer-level fabricated package (WFP), or wafer-level processed stack package (WSP).

Figure 9:
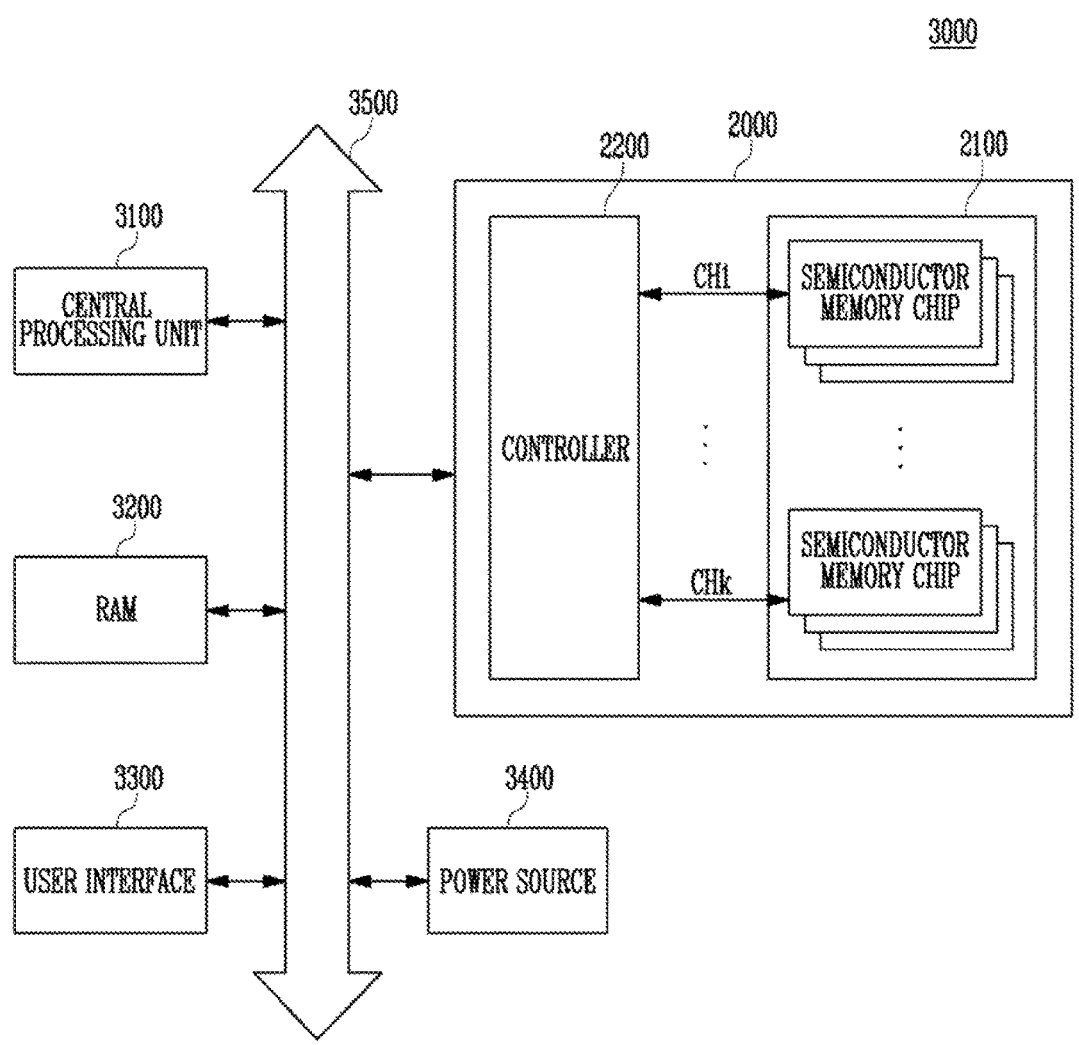
FIG. 9 is a block diagram illustrating a computing system including the memory system of FIG. 8, according to an embodiment of the present invention.

FIG. 9 is a block diagram illustrating a computing system 3000 including the memory system 2000 described with reference to FIG. 8.

Referring to FIG. 9, the computing system 3000 may include a central processing unit 3100, a random access memory (RAM) 3200, a user interface 3300, a power source 3400, a system bus 3500, and a memory system 2000.

The memory system 2000 is electrically coupled to the central processing unit 3100, the RAM 3200, the user interface 3300, and the power source 3400 through the system bus 3500. Data supplied through user interface 3300 or data processed by the central processing unit 3100 are stored in the memory system 2000.

In FIG. 9, it is illustrated that the semiconductor memory device 2100 is coupled to the system bus 3500 through the controller 2200. However, the semiconductor memory device 2100 may be directly coupled to the system bus 3500. In this case, the function of the controller 2200 may be performed by the central processing unit 3100 and the RAM 3200.

In FIG. 9, it is illustrated that the memory system 2000 described with reference to FIG. 8 is provided. However, the memory system 2000 may be replaced by the memory system described with reference to FIG. 1. As an exemplary embodiment, the computing system 3000 may be configured to include both the memory systems described with reference to FIGS. 1 and 8.

According to an embodiment of the present invention, as an event occurs, the controller may generate event information for debug analysis of the occurring event, and store the generated event information in the semiconductor memory device. According to an embodiment of the present invention, the operation of the debug processor is not used to perform debug analysis, but may detect the occurrence of various events and perform an operation required in an occurring event. For example, a condition for detecting the occurrence of an event may be set, event information to be stored may be set to map data management, and an operation to be performed may be set to a function, such as, garbage collection, thereby generating a required command and performing the corresponding operation. In the case of a conventional FTL, the conventional FTL may include a block for storing history log information so as to provide against sudden power loss. The history log information may be used to ensure the reliability of user data. Also, storage of the history log information may have a small storage depth and may be influenced by an operation of the firmware. According to the present invention, collection of data for debug processing and programming of the collected data can be performed even when the processor of the controller may be stuck, and hence it is possible to take a faster action. Further, failure analysis can be performed based on accurate history information, and hence it is possible to improve reliability.

According to the present invention, it is possible to provide a controller of a semiconductor memory device, which stores data for debug processing, and an operating method of the controller.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or In combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A controller for controlling a semiconductor memory device, the controller comprising:
   an event occurrence detection unit configured to detect whether an event occurs;
   an event information generation unit configured to generate event information, in response to the detected result; and
   a command generation unit configured to generate a command for storing the event information in the semiconductor memory device,
   wherein the semiconductor memory device includes a memory cell array configured to perform a program operation of storing data,
   wherein the event includes a time-out event that occurs when the program operation is performed in the semiconductor memory device, and is detected when a monitoring signal does not exist for a time-out time and a value of a data length counter is not a predetermined value, and
   wherein the monitoring signal periodically inputted for every set time is continuously inputted for the time-out time, and the value of the data length counter is a value for counting data input to the semiconductor memory device.

2. The controller of claim 1, wherein the event occurrence detection unit is configured to detect whether the event occurs by comparing event signals received through a plurality of event signal lines with an event expectation value representing states of the event signals.

3. The controller of claim 2, wherein the event occurrence detection unit includes:
an event occurrence signal table configured to store an event signal expectation value representing the states of the event signals when the event occurs; and
an enable signal generation unit configured to generate an enable signal using the states of the event signals received through the plurality of event signal lines and the event expectation value.

4. The controller of claim 1, wherein the event information generation unit configured to generate the event information on the basis of event data received through event data lines, in response to an enable signal indicating the detected result.

5. The controller of claim 4, wherein the event information generation unit includes:
a counter configured to generate an operation start signal in response to the enable signal, and, if a counter operation time is expired, to generate an operation end signal;
a storage signal generation unit configured to generate a storage signal for storing the event data received through the event data line in response to the operation start signal; and
an event data storage unit configured to store the event data received through the event data lines according to the storage signal.

6. The controller of claim 5, wherein the storage signal generation unit stops the generation of the storage signal in response to the operation end signal.

7. The controller of claim 5, wherein the event data storage unit stores the event data received for a time that is at least two times longer than the counter operation time.

8. The controller of claim 5, wherein the event data storage unit stores the event data using a first in first out (FIFO) method.

9. The controller of claim 1, wherein the event information includes event data from a preset time before and after a point of time when an event occurs.

10. The controller of claim 2, wherein the plurality of event signal lines are coupled to internal signal lines or external signal lines of the controller, respectively.

11. The controller of claim 4, wherein the event data includes information representing states of the internal signal lines or external signal lines of the controller.

12. The controller of claim 1, wherein the command generation unit includes a command storage unit configured to store a plurality of commands to be performed according to the event and the event information.

13. The controller of claim 1, wherein, if the event information is generated, the command generation unit determines whether the controller is in an operable state.

14. The controller of claim 13, wherein, when the controller is not in the operable state, the command generation unit performs a partial reset operation for operating the controller.

15. A method of operating a controller for controlling a semiconductor memory device, the method including:
comparing event signals input through a plurality of event signal lines with an event expectation value representing states of the event signals when an event occurs to detect the occurrence of the event;
generating event information including event data from a preset time before and after a point of time when the event occurs; and
generating a command for storing the event information in the semiconductor memory device,
wherein the semiconductor memory device includes a memory cell array configured to perform a program operation of storing data,
wherein the event includes a time-out event that occurs when the program operation is performed in the semiconductor memory device, and is detected when a monitoring signal does not exist for a time-out time and a value of a data length counter is not a predetermined value, and
wherein the monitoring signal periodically inputted for every set time is continuously inputted for the time-out time, and the value of the data length counter is a value for counting data input to the semiconductor memory device.

16. The method of claim 15, wherein the generating of the event information includes:
if the event occurs, operating a counter for a preset operation time;
storing the event data for the preset operation time; and
generating the event information on the basis of the stored event data.

17. The method of claim 15, wherein the generating of the command includes:
determining whether the event information has been generated;
if the event information is generated, determining whether the controller is in an operable state; and
if the controller is not in the operable state, performing a partial reset operation of the controller.

18. The method of claim 17, further comprising:
if the controller is in the operable state, generating a physical block address at which the event information is to be stored; and
transmitting, to the semiconductor memory device, the command for storing the event information, the physical block address, and the event information.

19. The method of claim 15, wherein the plurality of event signal lines are coupled to internal signal lines or external signal lines of the controller, respectively.

20. The method of claim 15, wherein the event data includes information representing states of the internal signal lines or external signal lines of the controller.

* * * * *